(12) United States Patent
Park

(10) Patent No.: US 11,034,355 B2
(45) Date of Patent: Jun. 15, 2021

(54) POWERTRAIN CONTROL METHOD FOR VEHICLE

(71) Applicants: HYUNDAI MOTOR COMPANY, Seoul (KR); KIA MOTORS CORPORATION, Seoul (KR)

(72) Inventor: Jun Sung Park, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/746,179

(22) Filed: Jan. 17, 2020

(65) Prior Publication Data

US 2021/0086776 A1  Mar. 25, 2021

(30) Foreign Application Priority Data

Sep. 23, 2019  (KR) .................. 10-2019-0116714

(51) Int. Cl.
| | |
|---|---|
| *B60W 10/06* | (2006.01) |
| *B60W 30/20* | (2006.01) |
| *B60K 17/06* | (2006.01) |
| *B60W 10/101* | (2012.01) |
| *B60K 17/02* | (2006.01) |

(52) U.S. Cl.
CPC .............. *B60W 30/20* (2013.01); *B60K 17/02* (2013.01); *B60K 17/06* (2013.01); *B60W 10/06* (2013.01); *B60W 10/101* (2013.01)

(58) Field of Classification Search
CPC .... B60W 30/20; B60W 10/06; B60W 10/101; B60K 17/06; B60K 17/02
See application file for complete search history.

(56) References Cited

U.S. PATENT DOCUMENTS

| 2018/0334162 A1* | 11/2018 | Lin ..................... B60W 10/06 |
| 2020/0010089 A1* | 1/2020 | Ford .................... B60W 20/10 |
| 2020/0331454 A1* | 10/2020 | An ....................... G05D 19/02 |

FOREIGN PATENT DOCUMENTS

KR    10-2013-0065168 A    6/2013

* cited by examiner

*Primary Examiner* — David J Hlavka
(74) *Attorney, Agent, or Firm* — Brinks Gilson & Lione

(57) ABSTRACT

A powertrain control method for a vehicle may include: setting, by a controller, a Noise Vibration Harshness (NVH) characteristic map based on an engine operating point to be used for a control of a powertrain based on a gradient of a road on which the vehicle is running; determining, by the controller, whether the vehicle is shifting; and selecting and performing, by the controller, at least one of a release of a lock-up state of a damper clutch or an additional rise of an engine torque based on whether a current engine operating point belongs to any level among a plurality of NVH levels classified in the NVH characteristic map when the vehicle is not shifting.

20 Claims, 14 Drawing Sheets

POWERTRAIN CONTROL METHOD FOR VEHICLE

CROSS REFERENCE TO RELATED APPLICATION

This application claims priority to and the benefit of Korean Patent Application No. 10-2019-0116714, filed on Sep. 23, 2019, the entire contents of which are incorporated herein by reference.

FIELD

The present disclosure relates to a powertrain control method for a vehicle, and more particularly, to a control of a powertrain including an engine and a transmission.

BACKGROUND

The statements in this section merely provide background information related to the present disclosure and may not constitute prior art.

A conventional automatic transmission is configured to receive power from an engine through a torque converter to shift it through a plurality of planetary gear devices to provide it to a drive wheel. The torque converter is provided with a damper clutch capable of locking-up a pump and a turbine, it is advantageous to obtain a smooth shift sense or a running sense if the damper clutch is released or slipped, and it is advantageous to enhance fuel economy if the damper clutch is fastened.

A conventional Continuously Variable Transmission (CVT) is configured to receive power from an engine through a torque converter provided with a damper clutch to form a continuous gear ratio with a pulley ratio formed by a belt, a drive pulley, and a driven pulley.

Meanwhile, during the running of a vehicle, the Noise Vibration Harshness (NVH) characteristics of the vehicle such as a booming noise deteriorates by an operation near a resonance area of an engine, and the noise vibration characteristics are greatly affected by the gear of the vehicle, the depression amount of the accelerator pedal, the gradient of the road on which the vehicle is running, a vehicle speed, and the like.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a powertrain control method for a vehicle, which may avoid deterioration of the NVH characteristics of the vehicle due to the operating condition of the vehicle, such as the operating area of an engine, as possible, or quickly escape the situation where the NVH characteristics are deteriorated to enhance the NVH characteristics of the vehicle, thereby forming a smoother and more comfortable running state of the vehicle to greatly enhance marketability of the vehicle ultimately.

In one form, the powertrain control method for a vehicle include: setting, by a controller, a Noise Vibration Harshness (NVH) characteristic map according to an engine operating point to be used for a control of a powertrain according to a gradient of a road on which a vehicle is running; determining, by the controller, whether the vehicle is shifting; and selecting and performing, by the controller, at least one of a release of a lock-up state of a damper clutch or an additional rise of an engine torque based on whether a current engine operating point belongs to a NVH level among a plurality of NVH levels classified in the NVH characteristic map, if the vehicle is not shifting. In particular, the plurality of NVH levels in the NVH characteristic map are classified from a level zero (0) to higher levels based on how much the NVH deteriorates, where the level zero (0) represents that the NVH characteristic is excellent not to require a separate control.

The NVH characteristic map may be calibrated according to an environmental factor of a position where the vehicle is running.

The environmental factor may be at least one of temperature, altitude, humidity, or atmospheric pressure of the position.

The release of the lock-up state of the damper clutch may be performed if a current engine operating point belongs to an area where the NVH level is a level 2 or more, and the additional rise of the engine torque may be performed if the current engine operating point belongs to an area where the NVH level is a level 1 or more.

In one form, when the vehicle is shifting, the powertrain control method may further include: determining whether the shifting is an upshift; determining whether the upshift is a power-on upshift among other upshifts; and prohibiting the power-on upshift during a predetermined first reference time, if the engine operating point after the upshift belongs to an area where the NVH level is a level 1 or more in the case of the power-on upshift.

If the vehicle is upshifting, the upshifting may be performed when the engine operating point after the upshifting belongs to an area where the NVH level is less than a level 1, or the first reference time has elapsed in the case of a power-off upshift or a power-on upshift, and at least one of the release of the lock-up state of the damper clutch and the additional rise of the engine torque may be selected and performed based on whether the engine operating point belongs to any level of a plurality of NVH levels classified in the NVH characteristic map after the upshifting has been performed.

The release of the lock-up state of the damper clutch may be performed when the engine operating point after the upshifting belongs to an area where the NVH level is a level 2 or more, and the additional rise of the engine torque may be performed if the engine operating point after the upshifting belongs to an area where the NVH level is a level 1 or more.

The powertrain control method for the vehicle may include: determining whether it is a power-on downshift if the vehicle is downshifting; and prohibiting a power-on upshift during a predetermined second reference time if the engine operating point after the shift belongs to an area where the NVH level is a level 1 or more in the case of the power-on downshift.

If the vehicle is downshifting, the downshifting may be performed if the engine operating point after the downshifting is expected to belong to an area where the NVH level is less than a level 1, or the second reference time has elapsed in the case of a power-off downshift or a power-on downshift, and at least one of the release of the lock-up state of the damper clutch or the additional torque of the engine torque may be selected and performed based on whether the engine operating point after the downshifting belongs to any NVH level among a plurality of NVH levels classified in the NVH characteristic map.

The release of the lock-up state of the damper clutch may be performed if the engine operating point after the downshifting belongs to an area where the NVH level is a level 2 or more, and the additional rise of the engine torque may be performed if the engine operating point after the downshifting belongs to an area where the NVH level is a level 1 or more.

In another from, a powertrain control method for a vehicle may include: setting, by a controller, an NVH characteristic map according to an engine operating point to be used for a control of a powertrain having a CVT according to the gradient of the road on which a vehicle is running; determining, by the controller, whether AT simulated logic is operating; and selecting and performing, by the controller, at least one of a release of a lock-up state of a damper clutch, a pulley ratio control slope change, or an additional rise of the engine torque based on whether a current engine operating point belongs to any NVH level among a plurality of NVH levels classified in the NVH characteristic map, if the AT simulated logic is not operating. In particular, the plurality of NVH levels classified in the NVH characteristic map are classified from a level zero (0) to higher levels based on how much the NVH deteriorates, where the NVH level zero (0) represents that the NVH characteristics are excellent and a separate control is not required.

The NVH characteristic map may be calibrated according to an environmental factor of a position where the vehicle is running.

The environmental factor may be at least one of temperature, altitude, humidity, or atmospheric pressure of the position.

The release of the lock-up state of the damper clutch may be performed if the engine operating point after the shift belongs to an area where the NVH level is a level 3 or more, the pulley ratio control slope change may be performed if the engine operating point after the shift belongs to an area where the NVH level is a level 2 or more, and the additional rise of the engine torque may be performed if the engine operating point after the shift belongs to an area where the NVH level is a level 1 or more.

If the AT simulated logic is operating, the powertrain control method for the vehicle may further include: determining whether the AT simulated logic is an upshift; determining whether the upshift is a power-on upshift among other upshifts; and when the power-on upshift is determined and when the engine operating point after the upshift is expected to belong to an area where the NVH level is equal to or greater than a level 3, performing at least one of the upshift after a shift delay during a predetermined third reference time or a gear ratio jump amount adjustment such that the engine operating point after the upshift becomes an area where the NVH level is the level zero (0).

If the engine operating point after the shift belongs to an area where the NVH level is equal to or greater than a level 1 even after performing at least one of the shift after the shift delay or the gear ratio jump amount adjustment, at least one of the release of the lock-up state of the damper clutch, the pulley ratio control slope change, or the additional rise of the engine torque may be selected and performed according to whether the engine operating point after the shift belongs to any level among the NVH levels.

The release of the lock-up state of the damper clutch may be performed if the current engine operating point belongs to an area where the NVH level is a level 3 or more.

In one form, the pulley ratio control slope change may be performed if the current engine operating point belongs to an area where the NVH level is a level 2 or more, and the additional rise of the engine torque may be performed if the current engine operating point belongs to an area where the NVH level is a level 1 or more.

If the vehicle is downshifting, the powertrain control method for the vehicle may further include: determining whether the downshifting is a power-on downshift; and when the power-on downshift is determined and when the engine operating point after the downshifting is expected to belong to an area where the NVH level is equal to or greater than a level 3, performing at least one of the downshifting after a shift delay during a predetermined fourth reference time and a gear ratio jump amount adjustment such that the engine operating point after the downshifting becomes an area where the NVH level is the level 0.

If the engine operating point after the shift belongs to an area where the NVH level is a level 1 or more even after performing at least one of the shift after the shift delay and the gear ratio jump amount adjustment, at least one of the release of the lock-up state of the damper clutch, the pulley ratio control slope change, or the additional rise of the engine torque may be selected and performed according to whether the engine operating point after the shift belongs to any level among the NVH levels.

The release of the lock-up state of the damper clutch may be performed if the engine operating point after the shift belongs to an area where the NVH level is a level 3 or more.

In one form, the pulley ratio control slope change may be performed if the engine operating point after the shift belongs to an area where the NVH level is a level 2 or more, and the additional rise of the engine torque may be performed if the engine operating point after the shift belongs to an area where the NVH level is a level 1 or more.

The present disclosure may, during the running of the vehicle, avoid deterioration of the NVH characteristics of the vehicle due to the operating condition of the vehicle, such as the operating area of an engine, as possible, or quickly escape the situation where the NVH characteristics are deteriorated to enhance the NVH characteristics of the vehicle, thereby forming a smoother and more comfortable running state of the vehicle to greatly enhance marketability of the vehicle ultimately.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
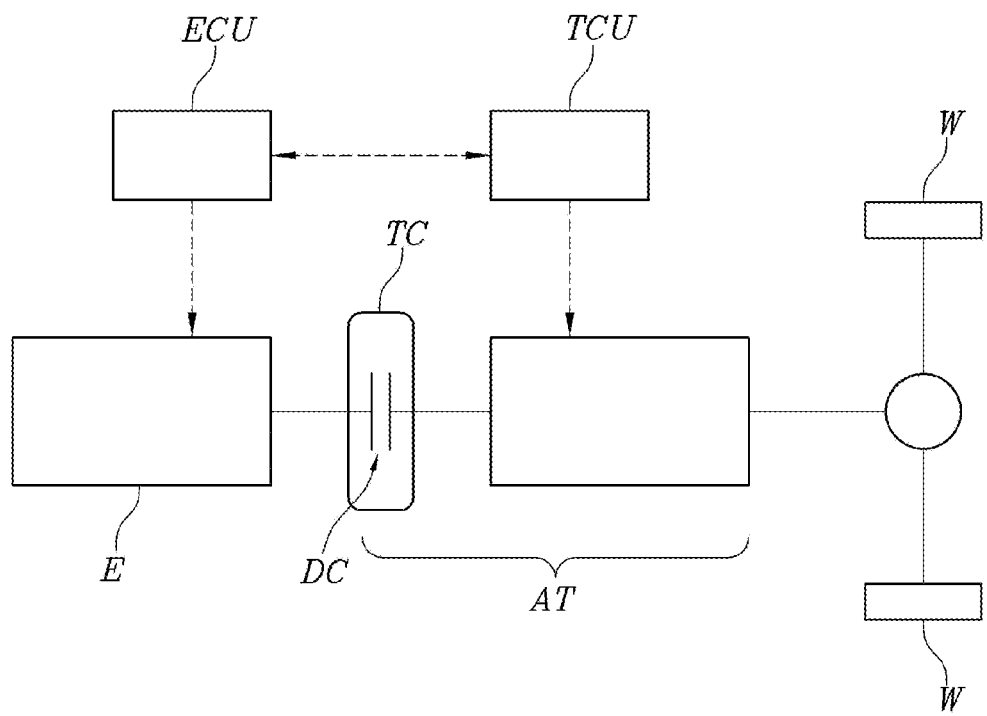
FIG. 1 is a diagram illustrating a powertrain having an engine and a general automatic transmission to which the present disclosure may be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates a powertrain for a vehicle equipped with a general automatic transmission (AT) to which a first form of the present disclosure may be applied, and the power of an engine (E) is configured to be shifted through the automatic transmission (AT) to be delivered to a drive wheel (W), and the automatic transmission (AT) is configured to receive the power of the engine through a torque converter (TC) to shift and output it in a gearbox equipped with planetary gear devices.

The torque converter (TC) is provided with a damper clutch (DC) capable of locking-up or releasing a pump and a turbine according to the running situation of the vehicle.

The engine is configured to be controlled by an Engine Control Unit (ECU), the automatic transmission is configured to be controlled by a Transmission Control Unit (TCU), and the ECU and the TCU are configured to communicate with each other to perform a consistent control.

The ECU and the TCU may be called different names, respectively, and may also be configured as a single control device integrated with each other, such that in the following description of the present disclosure, the term 'controller' is used as a concept of including both the ECU and the TCU. Therefore, in the present disclosure, the controller is used to refer to a control device for controlling a powertrain for a vehicle including an engine, a transmission, and the like.

Figure 2:
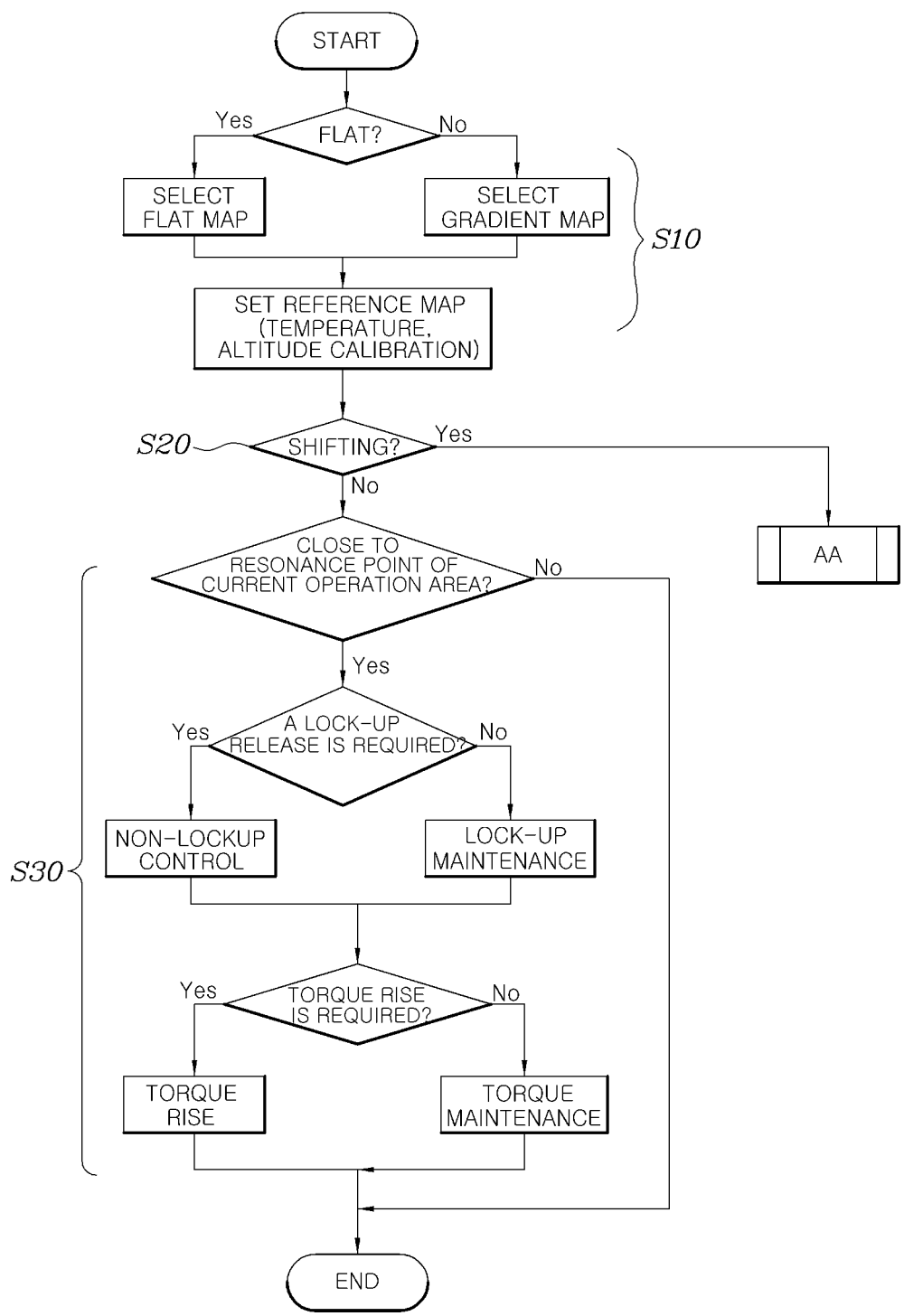
FIG. 2 is a flowchart illustrating a first form of a powertrain control method for a vehicle according to one form of the present disclosure.
Figure 3:
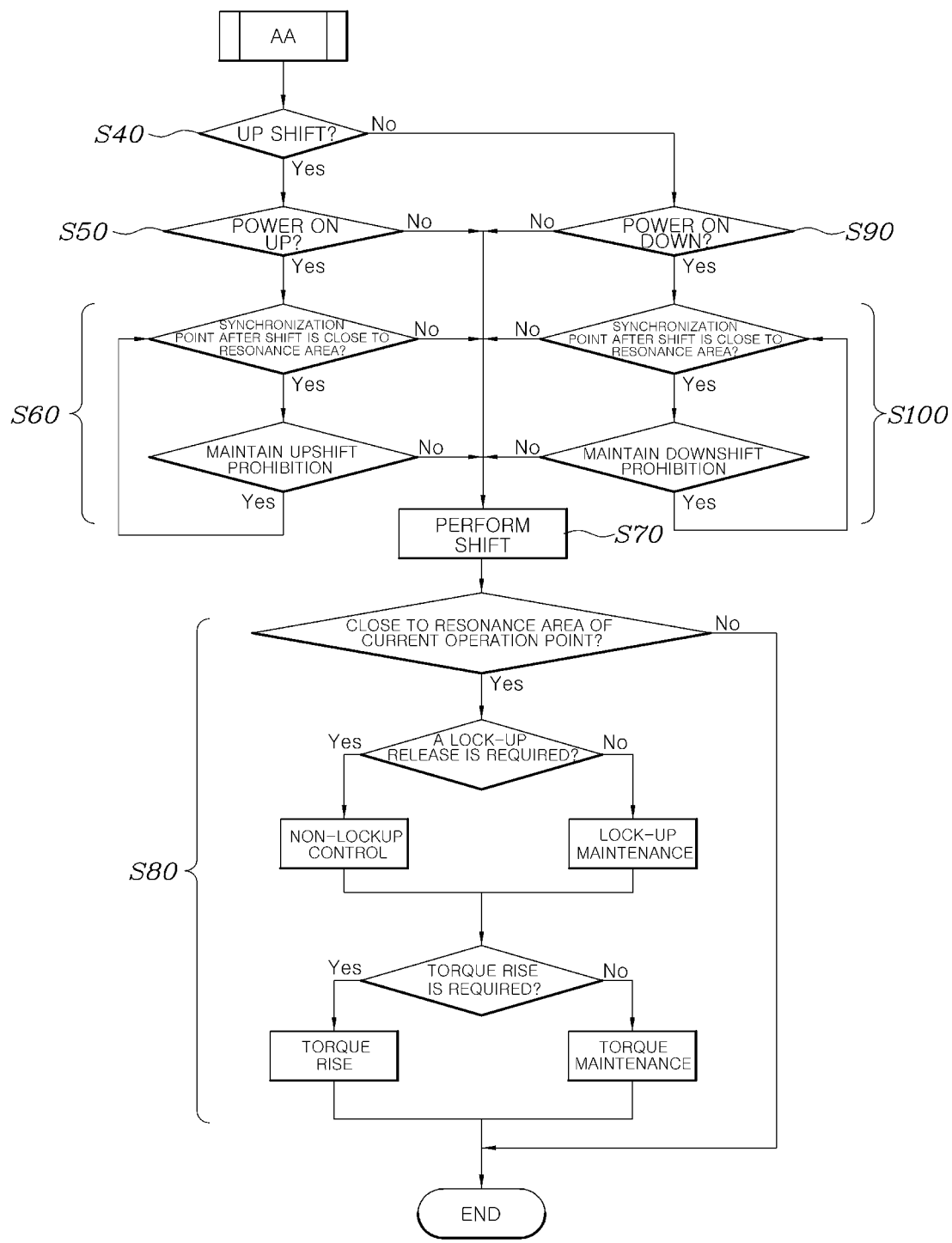
FIG. 3 is a flowchart connected from the flowchart in FIG. 2.

FIGS. 2 and 3 are flowcharts illustrating a first form of a powertrain control method for a vehicle according to one form of the present disclosure, and are configured to include setting, by a controller, an NVH characteristic map according to an engine operating point to be used for a control of the powertrain according to the gradient of the road on which the vehicle is running (operation S10); determining, by the controller, whether the vehicle is shifting (operation S20); and selecting and performing, by the controller, at least one of the release of the lock-up state of a damper clutch and the additional rise of the engine torque according to whether a current engine operating point belongs to any level of a plurality of NVH levels classified in the NVH characteristic map, if the vehicle is not shifting (operation S30).

That is, the present disclosure may take action such as the release of the lock-up state of the damper clutch or the additional rise of the engine torque according to the NVH level to which the current engine operating point belongs based on the NVH characteristic map, which is suitable for the gradient of the road on which the vehicle is currently running, among a plurality of NVH characteristic maps provided according to the gradient of the road, in the situation where the vehicle is not shifting to ultimately allow the engine to avoid or quickly escape the situation where the NVH characteristics are poor such as the resonance area to be operated in an area where the NVH characteristics are excellent, thereby forming a smoother and more comfortable running state of the vehicle to enhance marketability of the vehicle ultimately.

The plurality of NVH levels classified in the NVH characteristic map are classified into a higher level as the NVH deteriorates from a level 0 at which the NVH characteristics are excellent and a separate control is not required.

Figure 4:
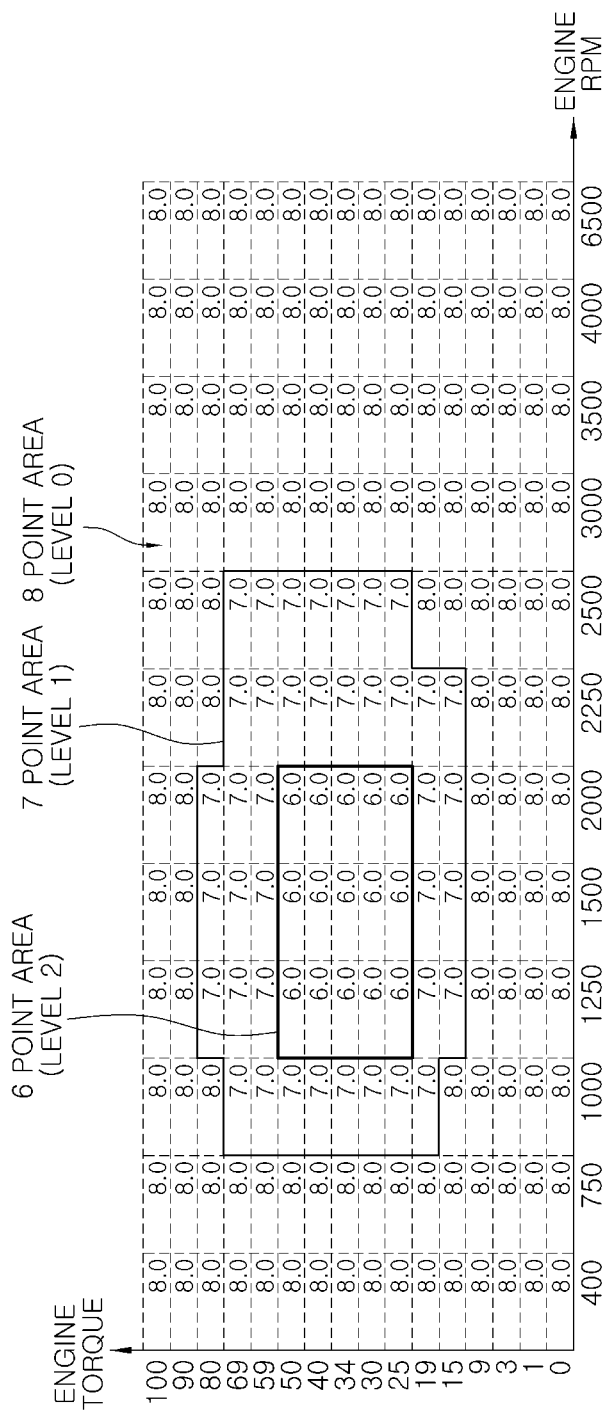
FIG. 4 is a diagram illustrating an example of an NVH characteristic map used to implement the present disclosure.

That is, as illustrated in FIG. 4, the NVH characteristic map is to set the NVH characteristics of the corresponding vehicle through a plurality of experiments, or the like in advance with respect to each area determined according to the engine RPM and the engine torque. For example, an area indicated by 8.0 refers to an area where the NVH level is a level 0, the NVH characteristics are excellent not to require any action for improving the NVH characteristics separately, and the running of the vehicle is maintained in the state. An area indicated by 7.0 refers to an area where the NVH level is a level 1, the running of the vehicle is possible but it may be desired to escape this area. In addition, an area indicated by 6.0 is a substantial resonance area where the NVH level is a level 2 and a control is desired for the engine to avoid the situation operated in this area and escape this area faster than in the level 1.

The operating area having poorer NVH characteristics than the situation where the NVH level is a level 2 may be an area where the NVH level is a level 3, it is classified by setting it such as 5.0 and it is desired to escape this area faster than in the level 2.

For reference, the score of each area determined according to the engine RPM and the engine torque may be given as 5.0 if the secondary component (C2 component) of the engine rotation, which is the main factor causing the resonance phenomenon of the four-cylinder engine, is greater than 70 dB, as 6.0 if it is greater than 50 dB and 60 dB or less, as 7.0 if it is greater than 40 dB and 50 dB or less, and as 8.0 if it is 40 dB or less, and the like.

Further, the vertical axis in FIG. 4 is represented as 'engine torque,' which may also be represented as 'throttle valve opening' according to the operation of the accelerator pedal. That is, the vertical axis in FIG. 4 may be regarded as 'the engine torque according to the throttle valve opening,' and numbers 0 to 100 represented on the vertical axis in FIG. 4 refer to % values of the throttle valve opening.

Of course, the NVH characteristic map may also be set to be classified into more various levels.

As described above, the NVH characteristic map is basically selected according to the gradient of the road on which the vehicle is running.

That is, the NVH characteristic map for the flat where the gradient of the road is zero, and at least one NVH characteristic map as the uphill angle increases are provided in advance, and a controller selects the corresponding NVH characteristic map according to the received gradient of the road on which the vehicle is currently running, or selects it by obtaining the NVH characteristic map suitable for the gradient of the running road through the interpolation, or the like.

For reference, FIG. 2 illustrates that one of a gradient map and a flat map is selected according to whether the road, on which the vehicle is running, is a flat on which the road has no gradient, and the NVH characteristic map illustrated in FIG. 4 is an example of the NVH characteristic map for the gradient of one specific road.

Further, the NVH characteristic map may be calibrated according to an environmental factor as well as the gradient of a position where the vehicle is running.

That is, the environmental factor may be at least one among temperature, altitude, humidity, and atmospheric pressure, such that the NVH characteristics of the engine may be changed even under the same road gradient, engine RPM, and engine torque situations according to temperature, altitude, humidity, atmospheric pressure or the like, for example, and in order to reflect it, the NVH characteristic map may be calibrated in the method for collectively multiplying values set to each area of the NVH characteristic map by a specific calibration coefficient according to temperature, altitude, humidity, or atmospheric pressure, or the like.

A first form of FIG. 2 illustrates a control in the in gear state where the vehicle is not shifting, and performs the release of the lock-up state of the damper clutch if the current engine operating point belongs to an area where the NVH level is a level 2 or more, and performs the additional rise of the engine torque if the current engine operating point belongs to an area where the NVH level is a level 1 or more.

Figure 5:
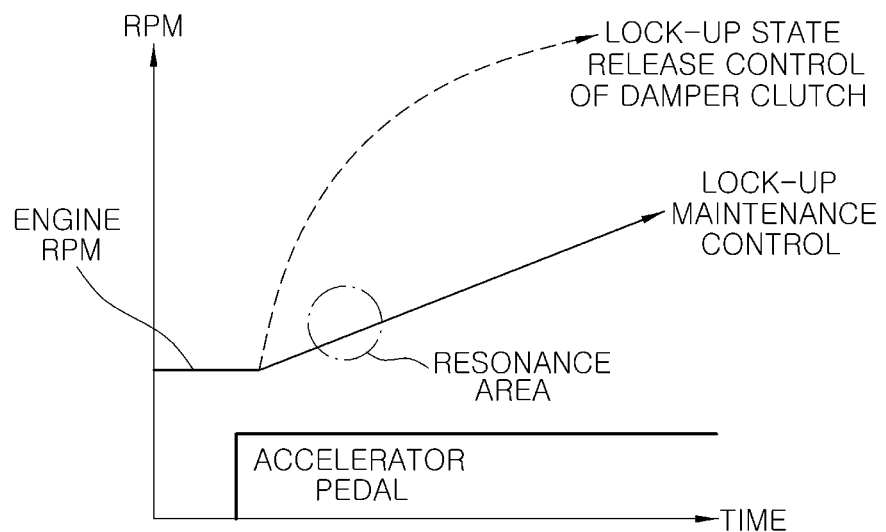
FIG. 5 is a diagram for explaining the effect of a case of releasing the lock-up state of a damper clutch.

FIG. 5 explains the effect of a case of releasing the lock-up state of the damper clutch, such that it is possible to release the damper clutch in the situation where the NVH characteristics of the vehicle will be degraded by passing the resonance area of the engine if the lock-up state of the damper clutch is continuously maintained to allow the engine operating point to avoid the resonance area, thereby consequentially maintaining the NVH characteristics of the vehicle in the excellent state.

Figure 6:
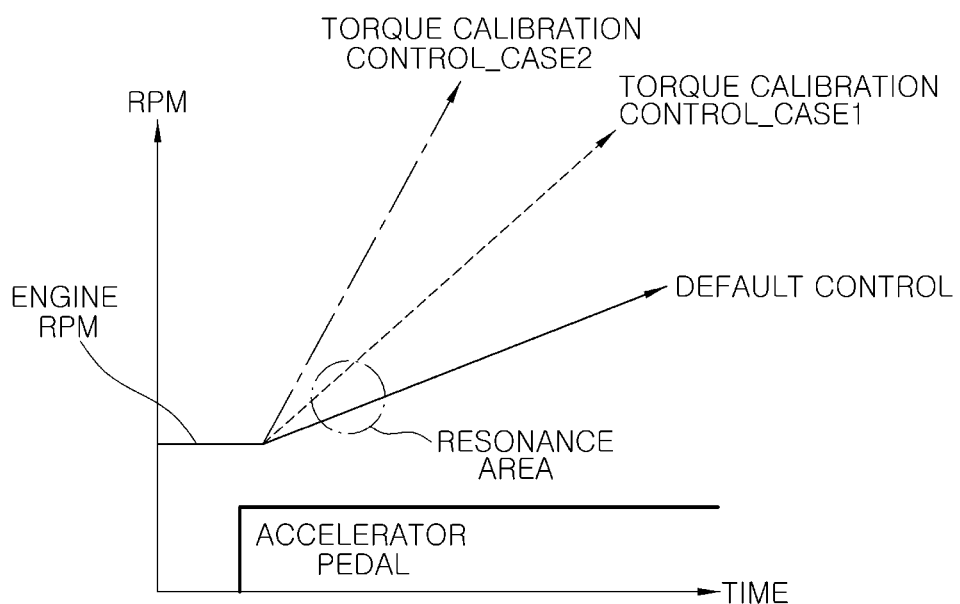
FIG. 6 is a diagram for explaining the effect of the additional rise of the engine torque.

FIG. 6 is a diagram for explaining the effect of the additional rise of the engine torque, and explains that in the situation where the driver steps on the accelerator pedal to gradually rise the engine RPM, it is possible to control to additionally generate a larger engine torque according to the present disclosure, thereby avoiding the resonance area or escape the resonance area more quickly against the fact that the engine stays in the resonance area for a long time in a Default control situation where a separate control according to the present disclosure is not applied.

Of course, here, the additional rise of the engine torque, as described above, is a torque further added compared to the engine torque that is desired to output according to the operation amount of the accelerator pedal of the driver, and may allow the controller to adjust the amount of engine torque added according to the operating situation, such that FIG. 6 explains by comparing together the cases where calibration of the additional torque has been applied as two cases differently from each other.

Meanwhile, the case where the vehicle is shifting in the present form, as illustrated in FIG. 3, performs determining whether it is an upshift (operation S40); determining whether it is a power-on upshift among the upshifts (operation S50); and prohibiting the power-on upshift during a predetermined first reference time, if the engine operating point after the shift is expected to belong to an area where the NVH level is a level 1 or more in the case of the power-on upshift (operation S60).

Figure 7:
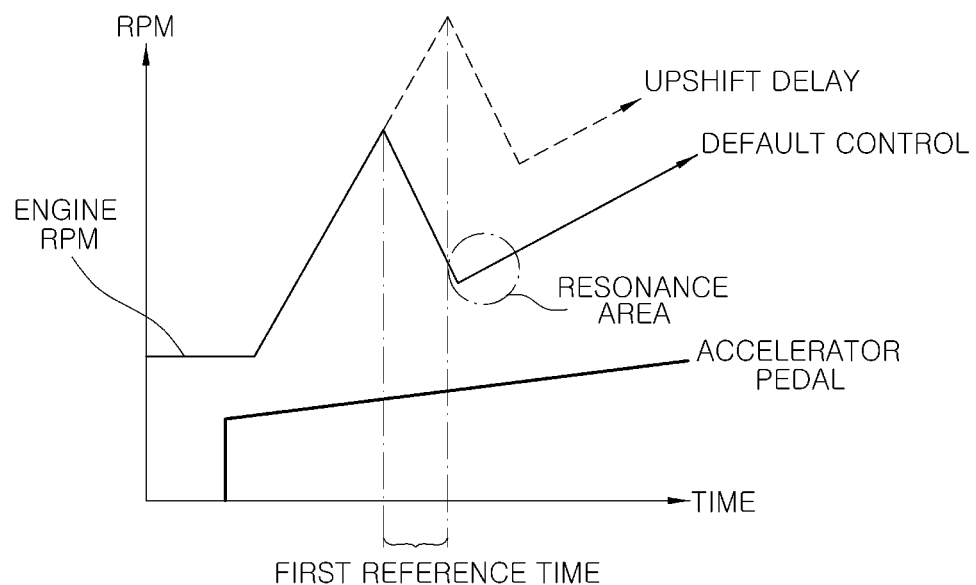
FIG. 7 is a diagram for explaining the effect of prohibiting a power-on upshift during a first reference time.

That is, as illustrated in FIG. 7, according to the Default control to which the control according to the present disclosure is not applied, it is possible to perform the shift after prohibiting the shift during the first reference time if the engine operating point after the shift is expected to belong to the resonance area of the engine so that the engine operating point after the shift may avoid the resonance area.

Therefore, the first reference time may be set to a level that may avoid the engine operating point after the shift to belong to the resonance area of the engine as described above, but if this time is too long, the passenger may feel the feeling that the shift is delayed, such that the first reference time is predetermined by a plurality of experiments and analyses within the range in which the resonance area after the shift may be avoided and the shift delay sense is not felt excessively.

Here, the NVH level of the area to which the engine operating point after the shift belongs may be expected by the controller in the method of reading the NVH level previously set to the area selected by the current engine torque or the throttle opening and the engine RPM after the shift from the NVH characteristic map previously provided as described above, or the like.

For reference, here, a power-on upshift refers to a case where the shift is performed to an upper gear in the state where the accelerator pedal has been stepped on by the driver, a power-off upshift refers to a case where the shift is performed to an upper gear in the state where the accelerator pedal has been released, a power-on downshift refers to a case where the shift is pertained to a lower gear in the state where the accelerator pedal has been operated, and a power-off downshift refers to a case where the shift is performed to a lower gear in the state where the accelerator pedal has not been stepped on.

Meanwhile, the present form performs the shift immediately if the engine operating point after the shift is expected to belong to an area where the NVH level is less than a level 1 even in the case where the first reference time has elapsed, in the case of the power-off upshift, or in the case of the power-on upshift (operation S70) and selects and performs any one or more of the release of the lock-up state of the damper clutch and the additional rise of the engine torque according to whether the engine operating point after the shift has been performed belongs to any level of the plurality of NVH levels classified in the NVH characteristic map (operation S80).

The present form may perform the release of the lock-up of the damper clutch if the engine operating point after the shift has been performed belongs to an area where the NVH level is a level 2 or more, and perform the additional rise of the engine torque if the engine operating point after the shift has been performed belongs to an area where the NVH level is a level 1 or more.

That is, if the engine operating point after the shift is not in a level 0 area having excellent NVH characteristics even if the shift has been performed after the first reference time has elapsed, the engine operating point is controlled to be in the level 0 area by additionally using the method such as the release of the lock-up state of the damper clutch or the additional rise of the engine torque.

Figure 8:
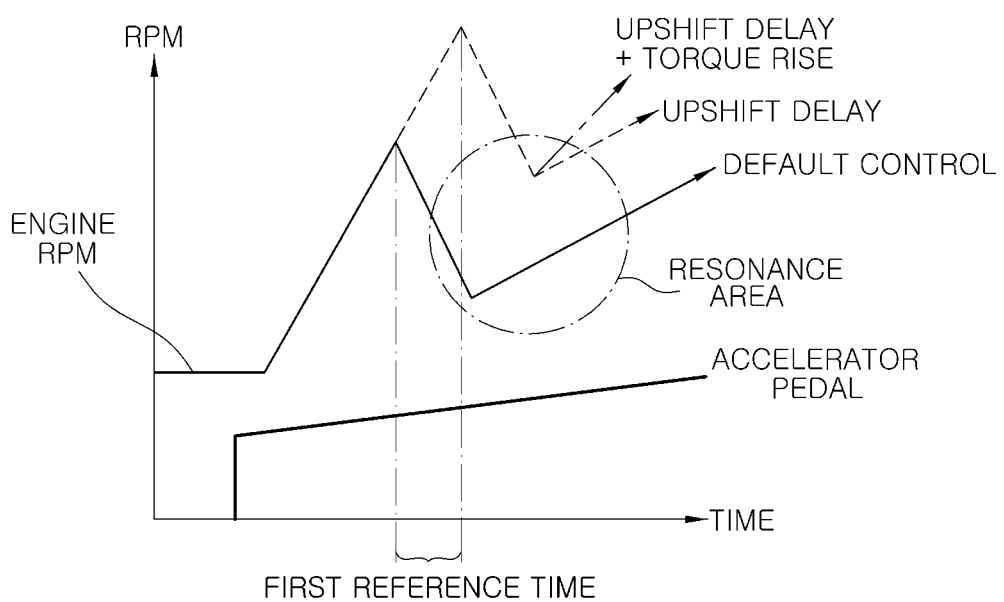
FIG. 8 is a diagram for explaining the effect of a case of prohibiting the power-on upshift during the first reference time, and using the additional rise of the engine torque together.

For reference, FIG. 8 explains the fact that escapes the resonance area by performing the additional rise of the engine torque additionally because the engine operating point after the shift does not completely escape the resonance area even if the shift has been performed after the first reference time has elapsed as described above.

Meanwhile, even after performing the power-off upshift or in the case of the power-on upshift, if the engine operating point after the shift is expected to belong to an area where the NVH level is less than a level 1 to perform the shift, the engine operating point after the shift mostly belongs to the NVH area of a level 0, thereby not requiring a separate control, but exceptionally, if the engine operating point after the shift is a level 1 or more and close to the resonance area or belongs to the resonance area, it is desired to quickly move to an area where the engine operating point is a level 0 by using the method such as the release of the lock-up state of the damper clutch or the additional rise of the engine torque as described above.

Meanwhile, even when the vehicle is downshifting, the concept of its basic control is the same as in the case of the above-described upshift, such that the present form includes determining whether it is a power-on downshift (operation S90) and prohibiting the power-on upshift during a predetermined second reference time, if the engine operating point after the shift is expected to belong to an area where the NVH level is a level 1 or more in the case of the power-on downshift (operation S100).

Figure 9:
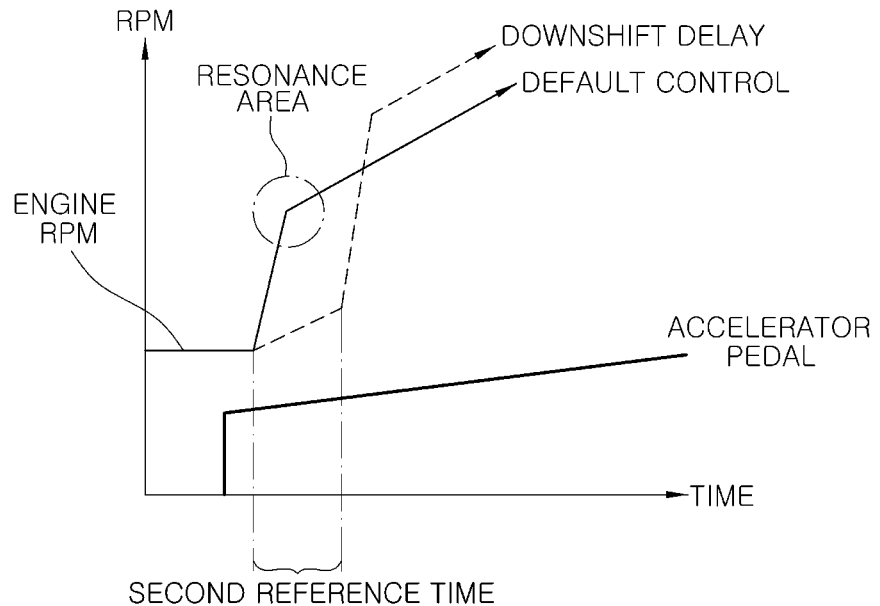
FIG. 9 is a diagram for explaining the effect of prohibiting a power-on downshift during a second reference time.

That is, as illustrated in FIG. 9, according to the Default control to which the control according to the present disclosure is not applied, if the engine operating point after the shift is expected to belong to the resonance area of the engine, it is possible to perform the shift after prohibiting the shift during the second reference time so that the engine operating point after the shift may avoid the resonance area.

Therefore, the second reference time may be set to a level that may avoid the engine operating point after the shift to belong to the resonance area of the engine as described above, but if this time is too long, the passenger may feel the feeling that the shift is delayed, such that it may be predetermined by a plurality of experiments and analyses within the range in which the resonance area after the shift may be avoided and the shift delay sense is not felt excessively.

Meanwhile, the present form performs the shift immediately as in the case of the upshift if the engine operating point after the shift is expected to belong to an area where the NVH level is less than a level 1, even when the second reference time has elapsed, in the case of the power-off downshift, or in the case of the power-on downshift (operation S70) and selects and performs any one or more of the release of the lock-up state of the damper clutch and the additional rise of the engine torque according to whether the engine operating point after the shift has been performed belongs to any level of a plurality of NVH levels classified in the NVH characteristic map (operation S80).

If the engine operating point after the shift has been performed belongs to an area where the NVH level is a level 2 or more, the present form may perform the release of the lock-up state of the damper clutch, and perform the additional rise of the engine torque if the engine operating point after the shift has been performed belongs to an area where the NVH level is a level 1 or more.

That is, if the engine operating point after the shift is not in a level 0 area having excellent NVH characteristics even if the shift has been performed after the second reference time has elapsed, the engine operating point is controlled to be in the level 0 area by additionally using the method such as the release of the lock-up state of the damper clutch or the additional rise of the engine torque.

Figure 10:
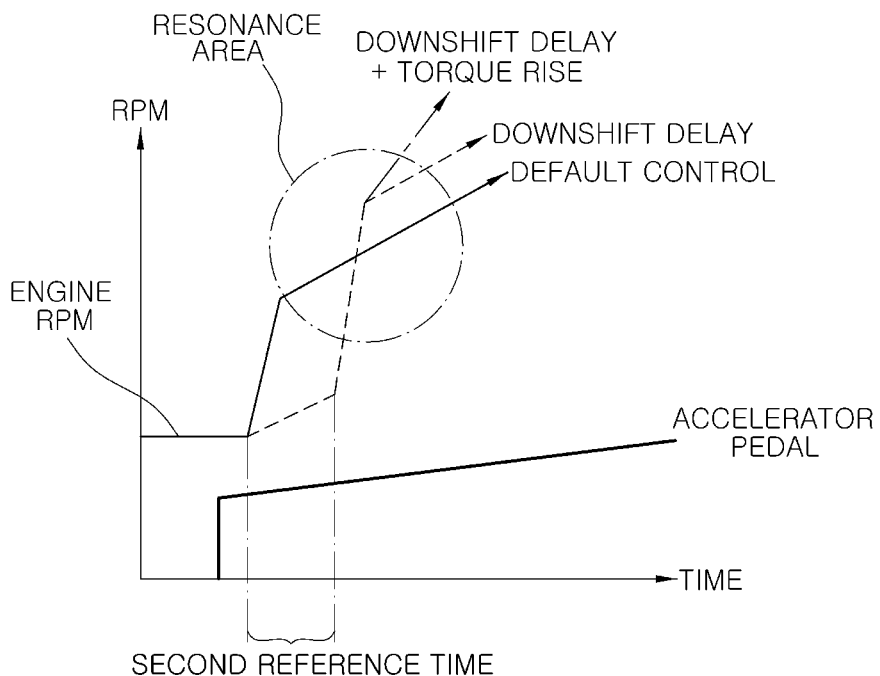
FIG. 10 is a diagram for explaining the effect of a case of prohibiting the power-on downshift during the second reference time, and using the additional rise of the engine torque together.

For reference, FIG. 10 explains the fact that escapes the resonance area by performing the additional rise of the engine torque additionally because the engine operating point after the shift does not completely escape the resonance area even if the shift has been performed after the second reference time has elapsed as described above.

Meanwhile, even after performing the power-off downshift or in the case of the power-on downshift, if the engine operating point after the shift is expected to belong to an area where the NVH level is less than a level 1 to perform the shift, the engine operating point after the shift mostly belongs to the NVH area of a level 0, thereby not requiring a separate control, but exceptionally, if the engine operating point after the shift is a level 1 or more and close to the resonance area or belongs to the resonance area, it is desired to quickly move to an area where the engine operating point is a level 0 by using the method such as the release of the lock-up state of the damper clutch or the additional rise of the engine torque as described above.

Figure 11:
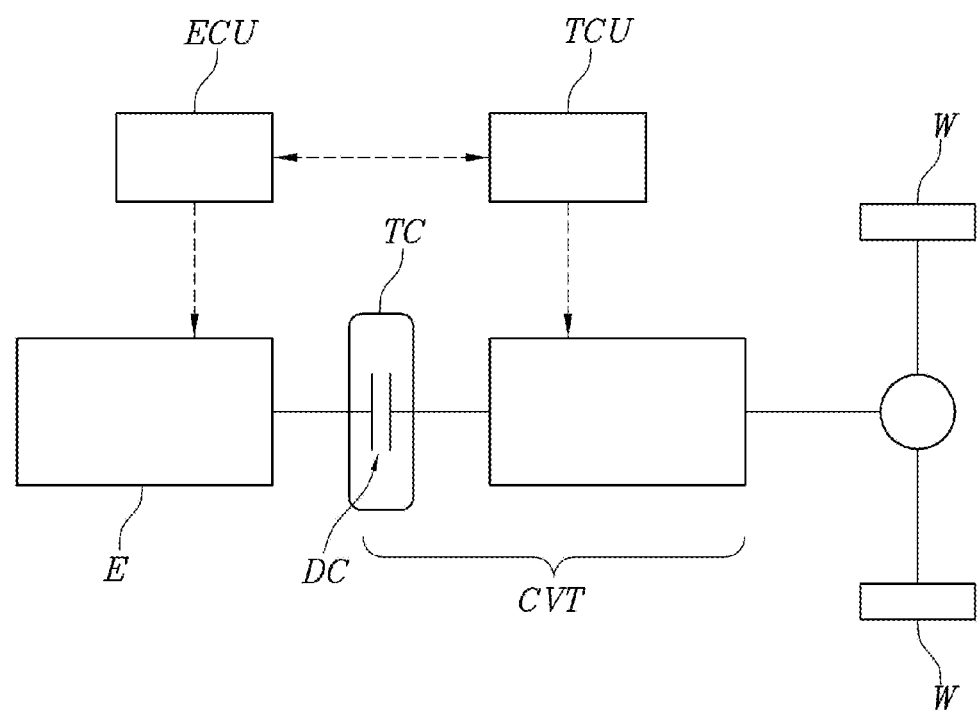
FIG. 11 is a diagram illustrating a powertrain having an engine and a general CVT to which the present disclosure may be applied.

Meanwhile, FIG. 11 illustrates a powertrain of a vehicle having a CVT to which a second form of the present disclosure may be applied; and the power of an engine (E) is configured to be shifted through the CVT to be delivered to a drive wheel (W), and the CVT is configured to receive the power of the engine through the torque converter (TC) to shift and output it in a gearbox provided with a pulley and a belt.

The torque converter (TC) is provided with a damper clutch (DC) capable of locking-up or releasing a pump and a turbine according to the running situation of the vehicle.

The engine is configured to be controlled by an Engine Control Unit (ECU), the automatic transmission is configured to be controlled by a Transmission Control Unit (TCU), and the ECU and the TCU are configured to communicate with each other to perform a consistent control.

Of course, here, the ECU and the TCU are collectively referred to as 'controller' as described above.

Figure 12:
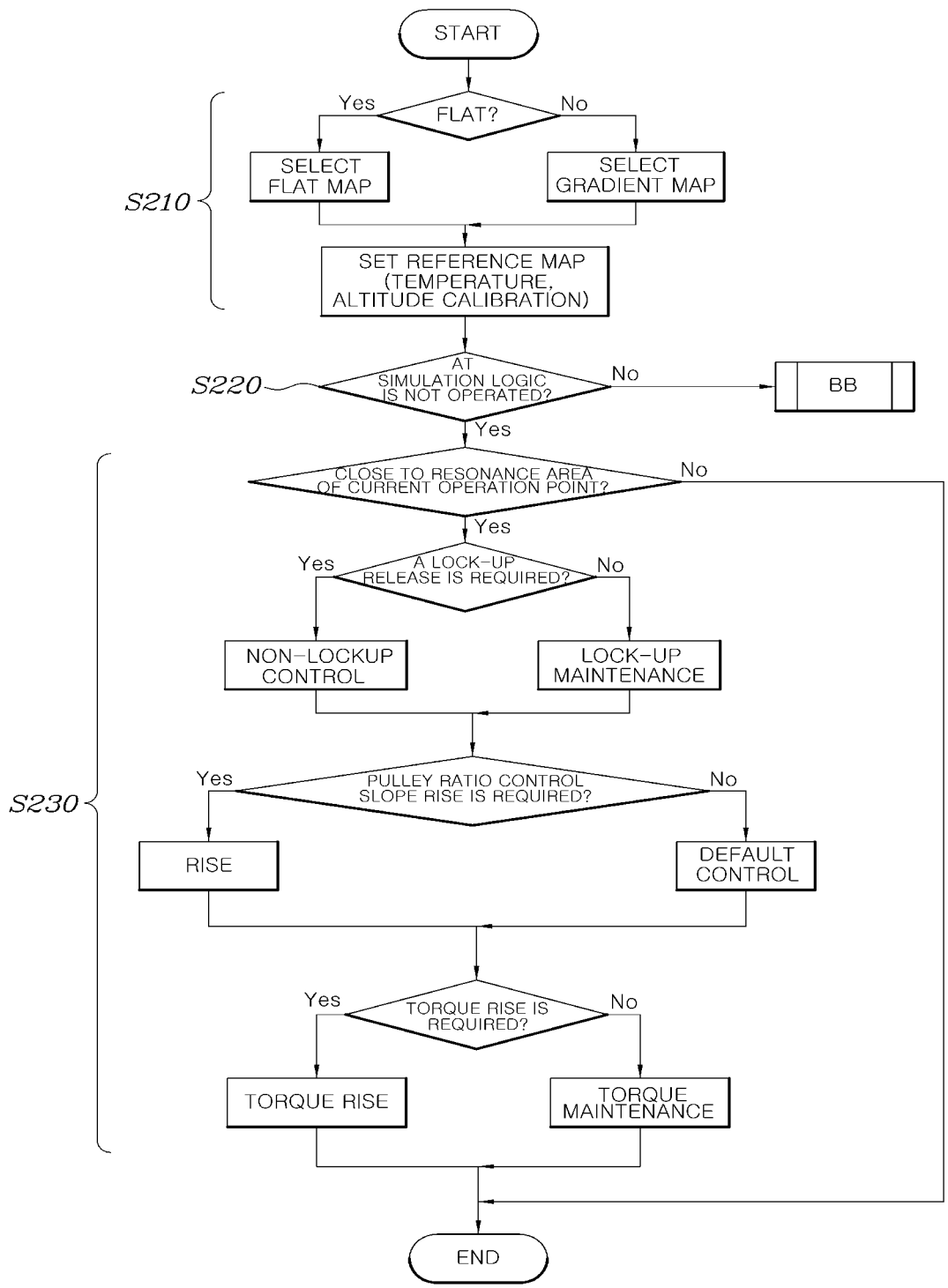
FIG. 12 is a flowchart illustrating a second form of a powertrain control method for a vehicle according to another form of the present disclosure.
Figure 13:
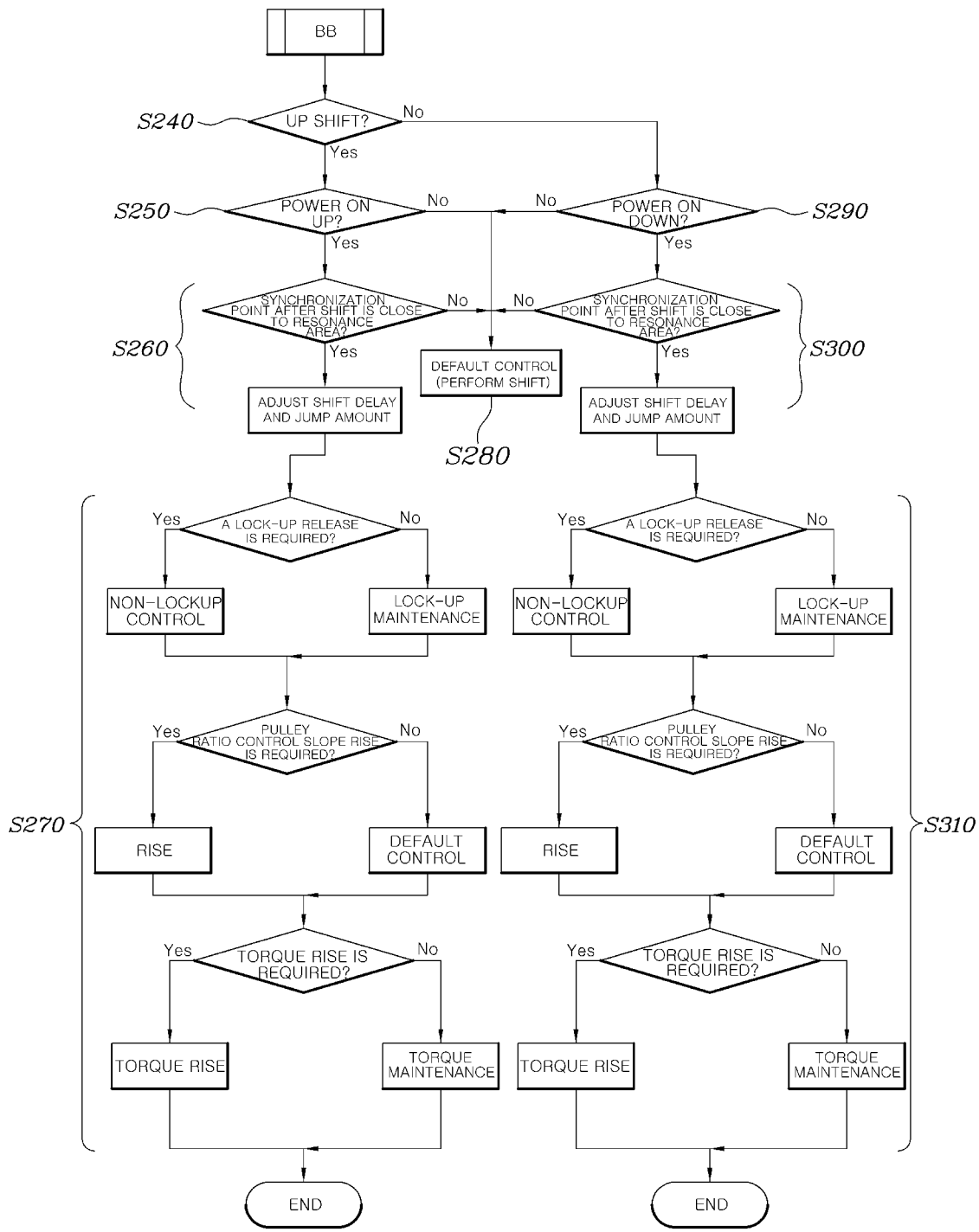
FIG. 13 is a flowchart connected from the flowchart in FIG. 2.

FIGS. 12 and 13 are flowcharts illustrating the second form of the powertrain control method for the vehicle according to the present disclosure, and are configured to include setting, by a controller, an NVH characteristic map according to an engine operating point to be used for a control of the powertrain provided with the CVT according to the gradient of the road on which the vehicle is running (operation S210); determining, by the controller, whether AT simulated logic is operating (operation S220); and selecting and performing, by the controller, any one or more among the release of the lock-up state of the damper clutch, the pulley ratio control slope change, and the additional rise of the engine torque according to whether a current engine operating point belongs to any level among a plurality of NVH levels classified in the NVH characteristic map if the AT simulated logic is not operating (operation S230).

That is, the present disclosure may take action such as the release of the lock-up state of the damper clutch, the pulley ratio control slope change, or the additional rise of the engine torque according to the NVH level to which the current engine operating point belongs based on the NVH characteristic map, which is suitable for the gradient of the road on which the vehicle is currently running, among the plurality of NVH characteristic maps provided according to the gradient of the road, in the situation where the AT simulated logic is not applied to ultimately allow the engine to avoid or quickly escape the situation where the NVH characteristics are poor such as the resonance area to be operated in an area where the NVH characteristics are excellent, thereby forming a smoother and more comfortable running state of the vehicle to enhance marketability of the vehicle ultimately.

For reference, the CVT is originally a transmission for continuously shifting the gear ratio, but the AT simulated logic refers to a control of jumping and shifting the gear ratio to form the shift sense as if performing the stepped shift even in the CVT, similar to the conventional AT, which is the general automatic transmission, and the AT simulated logic is a conventional known technology.

Meanwhile, since the contents of the NVH characteristic map are the same as those in the first form, a detailed description thereof will be omitted.

The second form of FIG. 12 illustrates the control in the situation where the AT simulated logic is not applied, such that the present form performs the release of the lock-up state of the damper clutch if the current engine operating point belongs to an area where the NVH level is a level 3 or more, performs the pulley ratio control slope change if the current engine operating point belongs to an area where the NVH level is a level 2 or more, and performs the additional rise of the engine torque if the current engine operating point belongs to an area where the NVH level is a level 1 or more.

Here, since the description of the release of the lock-up state of the damper clutch and the contents of the additional rise of the engine torque are the same as those in the first form, they will be omitted.

Figure 14:
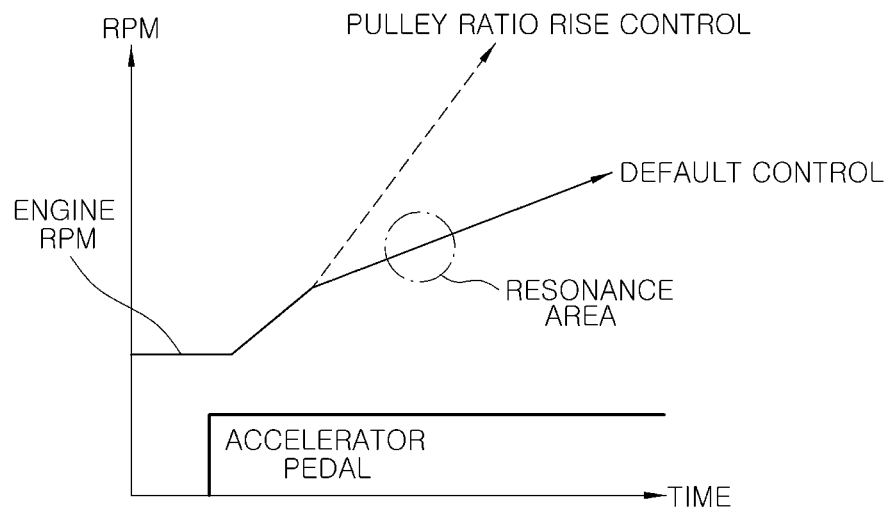
FIG. 14 is a diagram for explaining the effect of a pulley ratio control slope change in the second form.

As illustrated in FIG. 14, the pulley ratio control slope change explains the fact that may avoid or quickly escape the resonance area by rising and falling the pulley ratio against the fact that the engine RPM stays in the resonance area for a long time to greatly degrade the NVH characteristics of the vehicle according to the Default control to which the control according to the present disclosure is not applied.

Here, the pulley ratio refers to a diameter ratio of the belt contacting the drive pulley and the driven pulley; and substantially corresponds to the gear ratio of the CVT, the rising or falling of the pulley ratio is to rise and fall it further compared to the Default control, and the rising or falling slope thereof, or the like may use a value previously set by a plurality of experiments and analyses.

Meanwhile, if the AT simulated logic is operating, as illustrated in FIG. 13, the present form includes determining whether it is an upshift (operation S240); determining whether it is a power-on upshift among the upshifts (operation S250); and attempting so that the engine operating point after the shift becomes an area where the NVH level is a level 0 by performing at least one of the shift after the shift delay during a predetermined third reference time and the gear ratio jump amount adjustment if the engine operating point after the shift belongs to an area where the NVH level is a level 3 or more in the case of the power-on upshift (operation S260).

Figure 15:
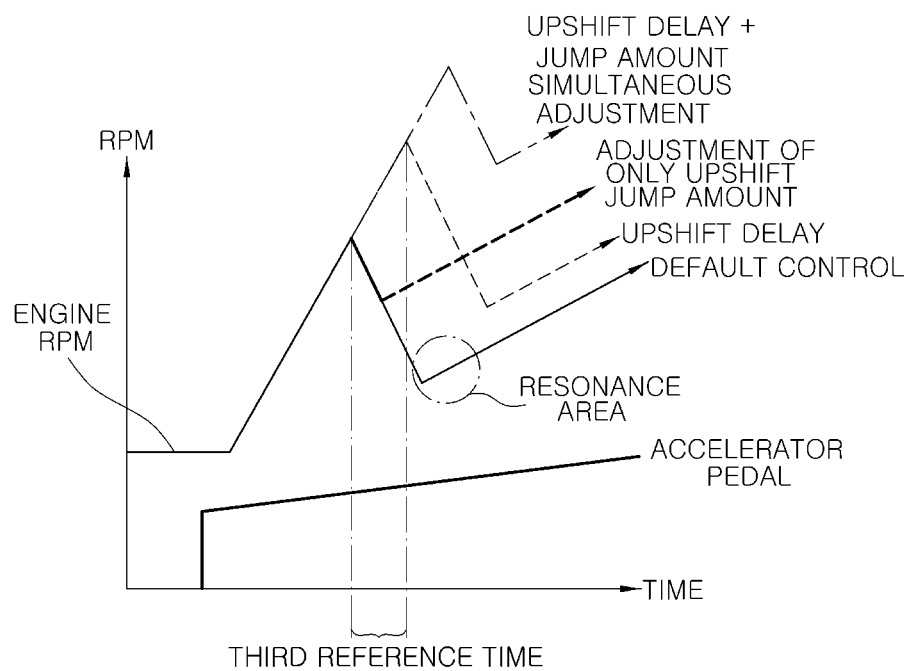
FIG. 15 is a diagram for explaining the effects of shifting after delaying the power-on upshift during a third reference time, and using at least one of the gear ratio jump amount adjustment, during the operation of AT simulated logic.

That is, referring to FIG. 15, according to the Default control to which the control according to the present disclosure is not applied, if the engine operating point after the shift is expected to belong to the resonance area of the engine, it is possible to delay the shift during the third reference time, to adjust the gear ratio jump amount, or perform both the shift delay and the gear ratio jump amount adjustment, thereby avoiding the resonance area, such that it is possible to perform any one among them, thereby maintaining the NVH characteristics of the vehicle in the excellent state.

Therefore, in one form, the third reference time is set to a level that may avoid the engine operating point after the shift to belong to the resonance area of the engine as described above, but if the time is too long, the passenger may feel the feeling that the shift is delayed, such that it may be predetermined by a plurality of experiments and analyses within the range in which the resonance area after the shift may be avoided and the shift delay sense is not felt excessively.

Here, the gear ratio jump amount adjustment is based on a change in a gear ratio set to be shifted by the AT simulated logic and to add or reduce the gear ratio thereto, and the magnitude thereof is basically determined by design based on a plurality of experiments and analyses to satisfy both the condition where the engine operating point after the shift is desired to avoid the resonance area, and the condition where it should be within a lower limit value that prevents the gear ratio jump amount from becoming too small to feel the stepped shift feeling, and an upper limit value that prevents the shift feeling from being excessively felt due to too large gear ratio jump amount.

Meanwhile, the present form selects and performs any one or more among the release of the lock-up state of the damper clutch, the pulley ratio control slope change, and the additional rise of the engine torque according to whether the engine operating point after the shift belongs to any level among the NVH levels, if the engine operating point after the shift belongs to an area where the NVH level is a level 1 or more even after performing at least one of the shift after the shift delay and the gear ratio jump amount adjustment (operation S270).

If the engine operating point after the shift belongs to an area where the NVH level is a level 3 or more, the present form may perform the release of the lock-up state of the damper clutch, perform the pulley ratio control slope change if the engine operating point after the shift belongs to an area where the NVH level is a level 2 or more, and perform the additional rise of the engine torque if the engine operating point after the shift belongs to an area where the NVH level is a level 1 or more.

Figure 16:
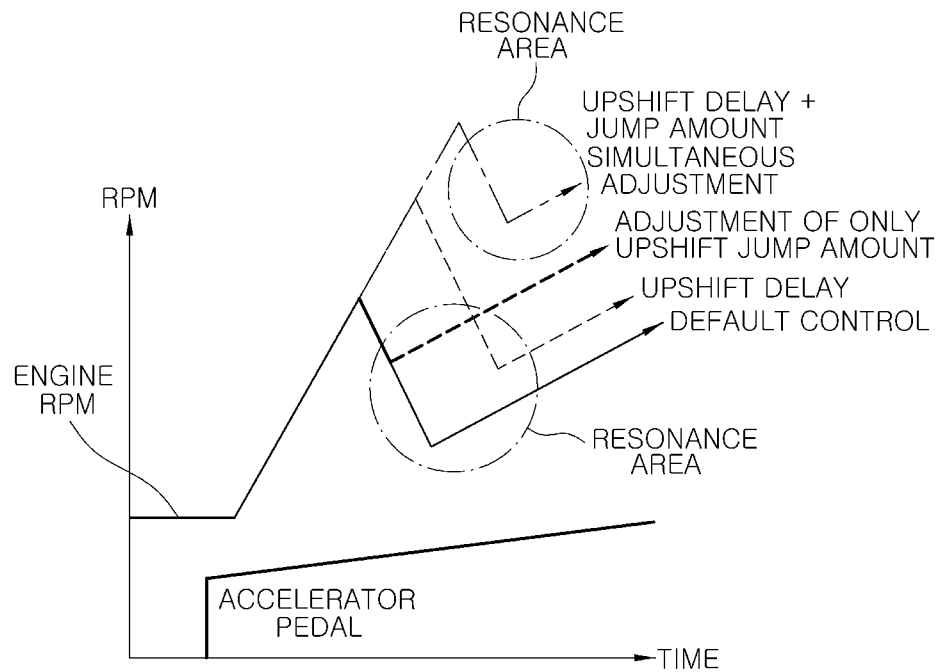
FIG. 16 is a diagram illustrating the situation where it is difficult to avoid a resonance area even by the control as in FIG. 15.

That is, as illustrated in FIG. 16, even when using the methods according to the present disclosure as illustrated in FIG. 15, the resonance area is too large, or a plurality of resonance areas are present, such that if the engine operating point after the shift is not in a level 0 area having excellent NVH characteristics, the engine operating point is controlled to be in the level 0 area by additionally using the method such as the release of the lock-up state of the damper clutch, the pulley ratio control slope change, or the additional rise of the engine torque.

Figure 17:
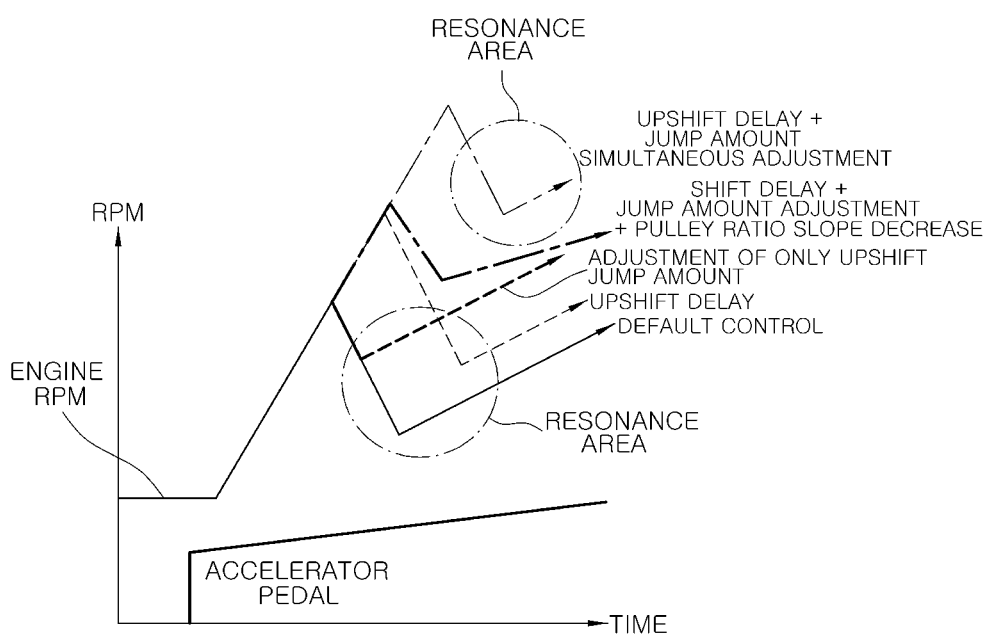
FIG. 17 is a diagram for explaining additionally performing the pulley ratio control slope change to avoid resonance areas in the situation as in FIG. 16.

FIG. 17 explains that face that additionally performs the above-described pulley ratio control slope change with respect to the shift after the shift delay and the gear ratio jump amount adjustment in the situation as in FIG. 16, thereby avoiding the resonance areas.

Of course, even in the case of performing the power-off upshift or in the case of the power-on upshift, the present form performs the control according to the conventional and general AT simulated logic as the Default control, if it is determined that the engine operating point after the shift is not close to the resonance area (operation S280).

Meanwhile, if the downshift of the vehicle by the AT simulated logic is performed, the present form includes determining whether it is the power-on downshift among the downshifts (operation S290) and attempting so that the engine operating point after the shift becomes an area where the NVH level is a level 0 by performing at least one of the shift after the shift delay during a predetermined fourth reference time and the gear ratio jump amount adjustment, if the engine operating point after the shift is expected to belong to an area where the NVH level is a level 3 or more in the case of the power-on downshift (operation S300).

Figure 18:
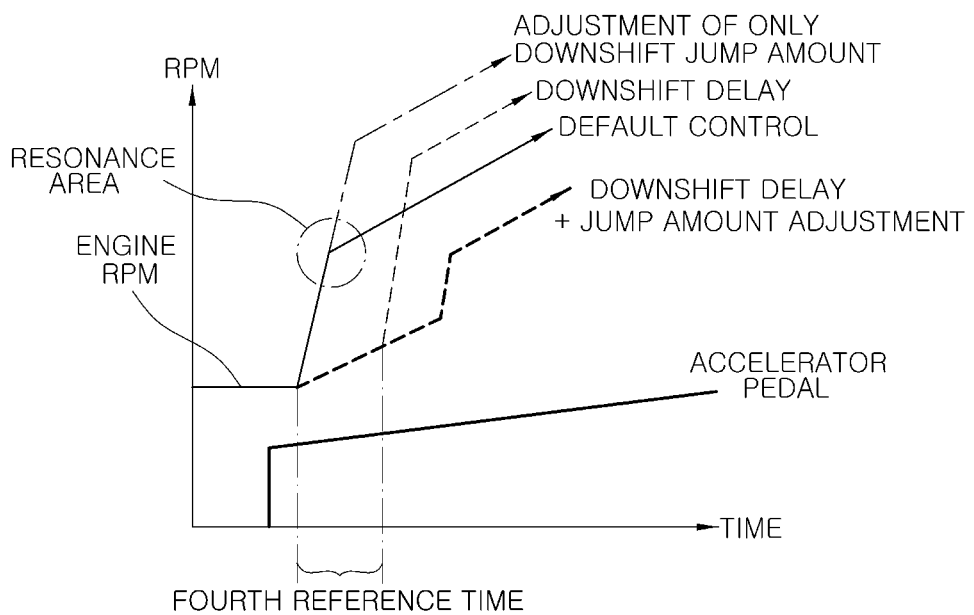
FIG. 18 is a diagram for explaining the effects of shifting after delaying the power-on downshift during a fourth reference time, and using at least one of the gear ratio jump amount adjustment, during the operation of AT simulated logic.

That is, referring to FIG. 18, according to the Default control to which the control according to the present disclosure is not applied, if the engine operating point after the shift is expected to belong to the resonance area of the engine, it is possible to delay the shift during the fourth reference time, to adjust the gear ratio jump amount, or to perform both the shift delay and the gear ratio jump amount adjustment, thereby avoiding the resonance area, such that it is possible to perform any one among them, thereby maintaining the NVH characteristics of the vehicle in the excellent state.

Therefore, in one form, the fourth reference time is set to a level that may avoid the engine operating point after the shift to belong to the resonance area of the engine as described above, but if the time is too long, the passenger may feel the feeling that the shift is delayed, such that it is desired to set in advance by a plurality of experiments and analyses within the range in which the resonance area after the shift may be avoided and the shift delay sense is not felt excessively.

Meanwhile, if the engine operating point after the shift belongs to an area where the NVH level is a level 1 or more even after performing at least one of the shift after the shift delay and the gear ratio jump amount adjustment, the present form selects and performs any one or more among the release of the lock-up state of the damper clutch, the pulley ratio control slope change, and the additional rise of the engine torque according to whether the engine operating point after the shift belongs to any level of the NVH levels (operation S310).

If the engine operating point after the shift belongs to an area where the NVH level is a level 3 or more, the present form may perform the release of the lock-up state of the damper clutch, perform the pulley ratio control slope change if the engine operating point after the shift belongs to an area where the NVH level is a level 2 or more, and perform the additional rise of the engine torque if the engine operating point after the shift belongs to an area where the NVH level is a level 1 or more.

Figure 19:
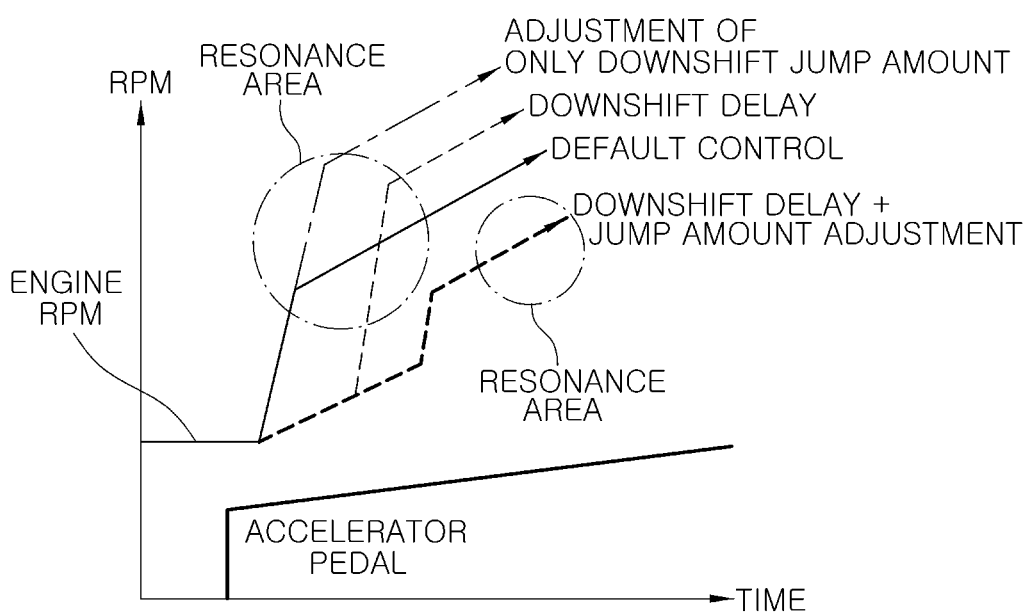
FIG. 19 is a diagram illustrating the situation where it is difficult to avoid a resonance area even by the control as in FIG. 18.

That is, as illustrated in FIG. 19, even when using the method according to the present disclosure as illustrated in FIG. 18, the resonance area is too large, or a plurality of resonance areas, such that if the engine operating point after the shift is not in the level 0 area having the excellent NVH characteristics, the engine operating point is controlled to be in the level 0 area by additionally using the method such as the release of the lock-up state of the damper clutch, the pulley ratio control slope change, or the additional rise of the engine torque.

Figure 20:
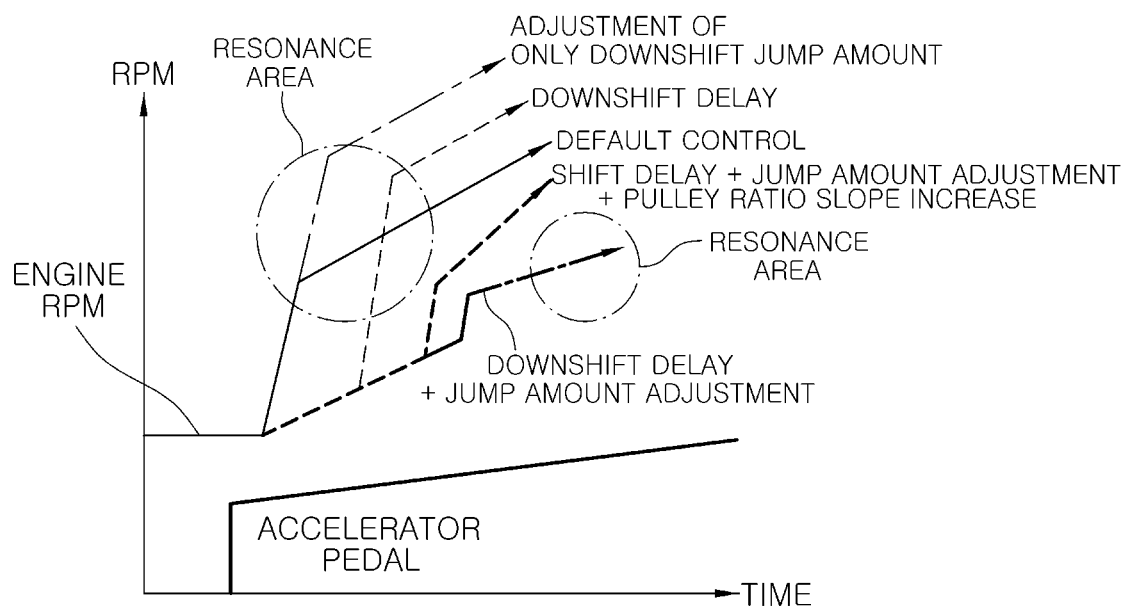
FIG. 20 is a diagram for explaining additionally performing the pulley ratio control slope change to avoid resonance areas in the situation as in FIG. 19.

FIG. 20 explains the fact that avoids the resonance areas by additionally performing the above-described pulley ratio control slope change with respect to the shift of the shift delay and the gear ratio jump amount adjustment, in the situation as in the FIG. 19 described above.

Of course, even in the case of performing the power-off downshift or in the case of the power-on downshift, the present form performs the control according to the conventional and general AT simulated logic as the Default control, if it is determined that the engine operating point after the shift is not close to the resonance area.

While it has been illustrated and described with respect to the specific forms of the present disclosure, it will be understood by those skilled in the art that various improvements and changes of the present disclosure may be made within the technical spirit of the present disclosure as provided by the following claims.

What is claimed is:

1. A powertrain control method for a vehicle, comprising:
setting, by a controller, a Noise Vibration Harshness (NVH) characteristic map based on an engine operating point to be used for a control of a powertrain based on a gradient of a road on which a vehicle is running;
determining, by the controller, whether the vehicle is shifting; and
selecting and performing, by the controller, at least one of a release of a lock-up state of a damper clutch or an additional rise of an engine torque based on whether a current engine operating point belongs to a NVH level among a plurality of NVH levels classified in the NVH characteristic map when the vehicle is not shifting,
wherein the plurality of NVH levels classified in the NVH characteristic map are classified from a level zero (0) to higher levels based on how much the NVH deteriorates, where the level zero (0) represents that the NVH characteristics are excellent not to require a separate control.

2. The powertrain control method according to claim 1, wherein the NVH characteristic map is calibrated based on an environmental factor of a position where the vehicle is running.

3. The powertrain control method according to claim 2, wherein the environmental factor is at least one of a temperature, an altitude, a humidity, or an atmospheric pressure of the position.

4. The powertrain control method according to claim 1, wherein the release of the lock-up state of the damper clutch is performed when a current engine operating point belongs to an area where the NVH level is equal to or greater than a level 2, and
wherein the additional rise of the engine torque is performed when the current engine operating point belongs to an area where the NVH level is equal to or greater than a level 1.

5. The powertrain control method according to claim 1, comprising:
when the vehicle is shifting,
determining whether the shifting is an upshift;
determining whether the upshift is a power-on upshift; and
prohibiting the power-on upshift during a predetermined first reference time when the engine operating point after the upshift belongs to an area where the NVH level is equal to or greater than a level 1 in case of the power-on upshift.

6. The powertrain control method according to claim 1, wherein: when the vehicle is upshifting,
the upshifting is performed when the engine operating point after the upshifting is expected to belong to an area where the NVH level is less than a level 1, or a first reference time has elapsed in case of a power-off upshift or a power-on upshift, and
at least one of the release of the lock-up state of the damper clutch or the additional rise of the engine torque is selected and performed based on whether the engine operating point after the upshifting has been performed belongs to a NVH level of a plurality of NVH levels classified in the NVH characteristic map.

7. The powertrain control method according to claim 6, wherein the release of the lock-up state of the damper clutch is performed when the engine operating point after the upshifting belongs to an area where the NVH level is equal to or greater than a level 2, and
wherein the additional rise of the engine torque is performed when the engine operating point after the upshifting belongs to an area where the NVH level is equal to or greater than the level 1.

8. The powertrain control method according to claim 1, further comprising:
determining whether the shifting is a power-on downshift when the vehicle is downshifting; and
prohibiting a power-on upshift during a predetermined second reference time when the engine operating point after the shifting belongs to an area where the NVH level is equal to or greater than a level 1 in case of the power-on downshift.

9. The powertrain control method according to claim 1, wherein: when the vehicle is downshifting,
the downshifting is performed when the engine operating point after the downshifting is expected to belong to an area where the NVH level is less than a level 1, or a second reference time has elapsed in case of a power-off downshift or a power-on downshift, and
at least one of the release of the lock-up state of the damper clutch or the additional rise of the engine torque is selected and performed based on whether the engine operating point after the downshifting has been performed belongs to a NVH level among a plurality of NVH levels classified in the NVH characteristic map.

10. The powertrain control method according to claim 9, wherein the release of the lock-up state of the damper clutch is performed when the engine operating point after the downshifting belongs to an area where the NVH level is equal to or greater than a level 2, and
wherein the additional rise of the engine torque is performed when the engine operating point after the downshifting belongs to an area where the NVH level is equal to or greater than the level 1.

11. A powertrain control method for a vehicle, the powertrain control method comprising:
setting, by a controller, a Noise Vibration Harshness (NVH) characteristic map based on an engine operating point to be used for a control of a powertrain having a continuously variable transmission (CVT) based on a gradient of a road on which a vehicle is running;
determining, by the controller, whether an automatic transmission (AT) simulated logic is operating; and
selecting and performing, by the controller, at least one of a release of a lock-up state of a damper clutch, a pulley ratio control slope change, or an additional rise of an engine torque based on whether a current engine operating point belongs to a NVH level among a plurality of NVH levels classified in the NVH characteristic map when the AT simulated logic is not operating,
wherein the plurality of NVH levels classified in the NVH characteristic map are classified from a level zero (0) to higher levels based on how much the NVH deteriorates, where the NVH level zero (0) represents that the NVH characteristics are excellent not to require a separate control.

12. The powertrain control method according to claim 11, wherein the NVH characteristic map is calibrated based on an environmental factor of a position where the vehicle is running.

13. The powertrain control method according to claim 12, wherein the environmental factor is at least one of a temperature, an altitude, a humidity, or an atmospheric pressure of the position.

14. The powertrain control method according to claim 11, wherein the release of the lock-up state of the damper clutch is performed when the current engine operating point belongs to an area where the NVH level is equal to or greater than a level 3,
wherein the pulley ratio control slope change is performed when the current engine operating point belongs to an area where the NVH level is equal to or greater than a level 2, and
wherein the additional rise of the engine torque is performed when the current engine operating point belongs to an area where the NVH level is equal to or greater than a level 1.

15. The powertrain control method according to claim 11, further comprising:
when the AT simulated logic is operating,
determining whether the AT simulated logic is for an upshift;
determining whether the upshift is a power-on upshift among other upshifts; and
when the power-on upshift is determined and when the engine operating point after the upshift is expected to belong to an area where the NVH level is equal to or greater than a level 3, performing at least one of the upshift after a shift delay during a predetermined third reference time or a gear ratio jump amount adjustment such that the engine operating point after the upshift becomes an area where the NVH level is the level zero (0).

16. The powertrain control method according to claim 15, wherein when the engine operating point after the upshift belongs to an area where the NVH level is equal to or greater than a level 1 even after performing the at least one of the upshift after the shift delay or the gear ratio jump amount adjustment,
at least one of the release of the lock-up state of the damper clutch, the pulley ratio control slope change, or the additional rise of the engine torque are selected and performed based on whether the engine operating point after the upshift belongs to a NVH level among the plurality of NVH levels.

17. The powertrain control method according to claim 16,
wherein the release of the lock-up state of the damper clutch is performed when the engine operating point after the upshift belongs to an area where the NVH level is equal to or greater than the level 3,
wherein the pulley ratio control slope change is performed when the engine operating point after the upshift belongs to an area where the NVH level is equal to or greater than a level 2, and
wherein the additional rise of the engine torque is performed when the engine operating point after the upshift belongs to an area where the NVH level is equal to or greater than the level 1.

18. The powertrain control method according to claim 11, further comprising:
when the vehicle is downshifting,
determining whether the downshifting is a power-on downshift; and
when the power-on downshift is determined and when the engine operating point after the downshifting is expected to belong to an area where the NVH level is equal to or greater than a level 3, performing at least one of the downshifting after a shift delay during a predetermined fourth reference time and a gear ratio jump amount adjustment such that the engine operating point after the downshifting becomes an area where the NVH level is the level 0.

19. The powertrain control method according to claim 18,
wherein when the engine operating point after the downshifting belongs to an area where the NVH level is equal to or greater than a level 1 even after performing the at least one of the downshifting after the shift delay or the gear ratio jump amount adjustment,
at least one of the release of the lock-up state of the damper clutch, the pulley ratio control slope change, or the additional rise of the engine torque is selected and performed based on whether the engine operating point after the downshifting belongs to a NVH level among the plurality of NVH levels.

20. The powertrain control method according to claim 19,
wherein the release of the lock-up state of the damper clutch is performed when the engine operating point after the downshifting belongs to an area where the NVH level is equal to or greater than the level 3,
wherein the pulley ratio control slope change is performed when the engine operating point after the downshifting belongs to an area where the NVH level is equal to or greater than a level 2, and
wherein the additional rise of the engine torque is performed when the engine operating point after the downshifting belongs to an area where the NVH level is equal to or greater than the level 1.

\* \* \* \* \*